United States Patent
Haga et al.

(10) Patent No.: US 10,906,586 B2
(45) Date of Patent: Feb. 2, 2021

(54) VEHICLE BODY STRUCTURE

(71) Applicant: HONDA MOTOR CO., LTD., Tokyo (JP)

(72) Inventors: Akira Haga, Wako (JP); Tomohito Kamada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 101 days.

(21) Appl. No.: 16/322,204

(22) PCT Filed: Jul. 5, 2017

(86) PCT No.: PCT/JP2017/024709
§ 371 (c)(1),
(2) Date: Jan. 31, 2019

(87) PCT Pub. No.: WO2018/025565
PCT Pub. Date: Feb. 8, 2018

(65) Prior Publication Data
US 2019/0185061 A1    Jun. 20, 2019

(30) Foreign Application Priority Data
Aug. 2, 2016  (JP) ................. 2016-152239

(51) Int. Cl.
*B62D 21/15* (2006.01)
*B62D 25/08* (2006.01)
*B62D 21/02* (2006.01)

(52) U.S. Cl.
CPC ........... *B62D 21/155* (2013.01); *B62D 21/15* (2013.01); *B62D 25/08* (2013.01); *B62D 25/082* (2013.01); *B62D 21/02* (2013.01)

(58) Field of Classification Search
CPC .............................. B62D 25/08; B62D 25/082
See application file for complete search history.

(56) References Cited

U.S. PATENT DOCUMENTS 5,853,195 A * 12/1998 Le ..................... B62D 21/152
280/784
9,233,715 B1 * 1/2016 Ramoutar ............ B62D 21/152
(Continued)

FOREIGN PATENT DOCUMENTS

JP      H05-105110 A    4/1993
JP      2004-075021 A   3/2004
(Continued)

OTHER PUBLICATIONS

International Search Report by ISA/JP dated Sep. 19, 2017, on PCT/JP2017/024709 (5 pages).
(Continued)

*Primary Examiner* — Gregory A Blankenship
(74) *Attorney, Agent, or Firm* — Rankin, Hill & Clark LLP

(57) ABSTRACT

A vehicle body structure includes: a hollow frame that presents a substantially rectangular closed cross section and has a brittle section in the center part in the length direction of one wall section; and an energy-absorbing member facing the brittle section with a gap therebetween and attached to another wall section that faces the one wall section in the closed cross section of the hollow frame. The energy-absorbing member has a first wall section and a second wall section erectly provided from the other wall section toward the one wall section, and a third wall section connecting the tip end part of the first wall section and the tip end part of the second wall section. The third wall section faces the brittle section with a gap therebetween.

10 Claims, 10 Drawing Sheets

(56) References Cited

U.S. PATENT DOCUMENTS

| | | | |
|---|---|---|---|
| 9,422,007 B2* | 8/2016 | Suzuki | B62D 21/155 |
| 9,738,320 B2* | 8/2017 | Miyamoto | B60R 19/26 |
| 9,764,702 B2* | 9/2017 | Planas | H02J 1/14 |
| 10,252,750 B2* | 4/2019 | Kodama | B62D 21/152 |
| 10,272,948 B2* | 4/2019 | Baccouche | C21D 1/673 |
| 10,479,409 B2* | 11/2019 | Fujiwara | B62D 21/155 |
| 2008/0174150 A1* | 7/2008 | Yamada | B62D 29/008 |
| | | | 296/203.01 |
| 2012/0074734 A1* | 3/2012 | Yoshida | B62D 21/152 |
| | | | 296/203.02 |
| 2012/0248820 A1 | 10/2012 | Yasui et al. | |
| 2013/0088049 A1 | 4/2013 | Mazur et al. | |
| 2014/0015280 A1* | 1/2014 | Ohta | B62D 21/152 |
| | | | 296/187.08 |
| 2014/0167450 A1* | 6/2014 | Sotoyama | B62D 21/152 |
| | | | 296/187.09 |
| 2016/0152273 A1 | 6/2016 | Kuriyama et al. | |
| 2016/0170206 A1* | 6/2016 | Osborne | G02F 1/163 |
| | | | 345/8 |
| 2016/0347371 A1* | 12/2016 | Cazes | B62D 21/152 |
| 2016/0347374 A1 | 12/2016 | Miyamoto et al. | |
| 2017/0036699 A1* | 2/2017 | Asai | B62D 25/082 |
| 2017/0050675 A1* | 2/2017 | Kellner | B62D 21/15 |
| 2017/0088180 A1* | 3/2017 | Takeda | B62D 25/08 |
| 2017/0113735 A1* | 4/2017 | Kawabe | B60R 19/34 |
| 2017/0197661 A1* | 7/2017 | Nakamoto | B62D 21/152 |
| 2018/0043937 A1* | 2/2018 | Sopel | B62D 21/02 |
| 2018/0043938 A1* | 2/2018 | Tsuneyama | B62D 21/15 |
| 2018/0362087 A1* | 12/2018 | Kodama | B62D 21/02 |
| 2019/0031011 A1* | 1/2019 | Fujiaki | B62D 21/02 |
| 2019/0061825 A1* | 2/2019 | Nakamura | B62D 21/155 |
| 2019/0344650 A1* | 11/2019 | Suumen | B60K 1/04 |

FOREIGN PATENT DOCUMENTS

| | | |
|---|---|---|
| JP | 2012-214211 A | 11/2012 |
| JP | 2014-162347 A | 9/2014 |
| JP | 2015-009712 A | 1/2015 |
| JP | 2015-227124 A | 12/2015 |
| WO | 2015122276 A1 | 8/2015 |

OTHER PUBLICATIONS

Written Opinion by ISA/JP dated Sep. 19, 2017, on PCT/JP2017/024709 (4 pages).

* cited by examiner

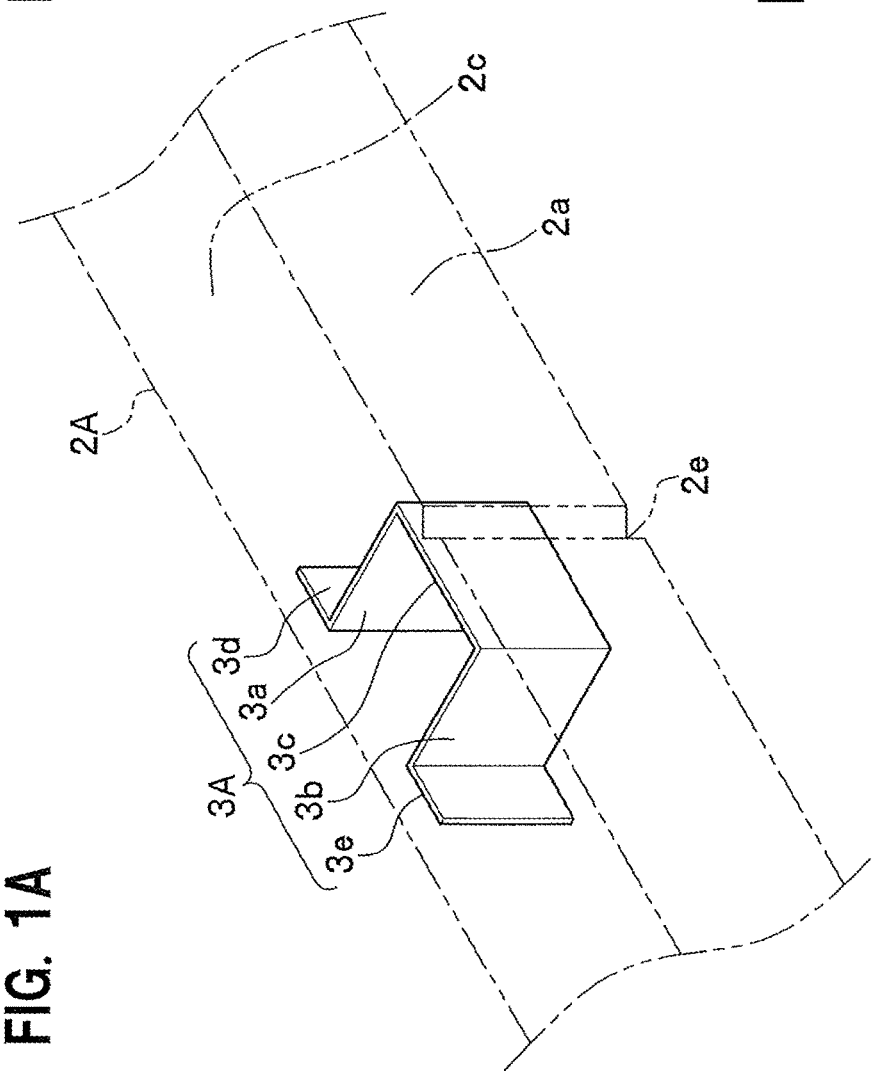
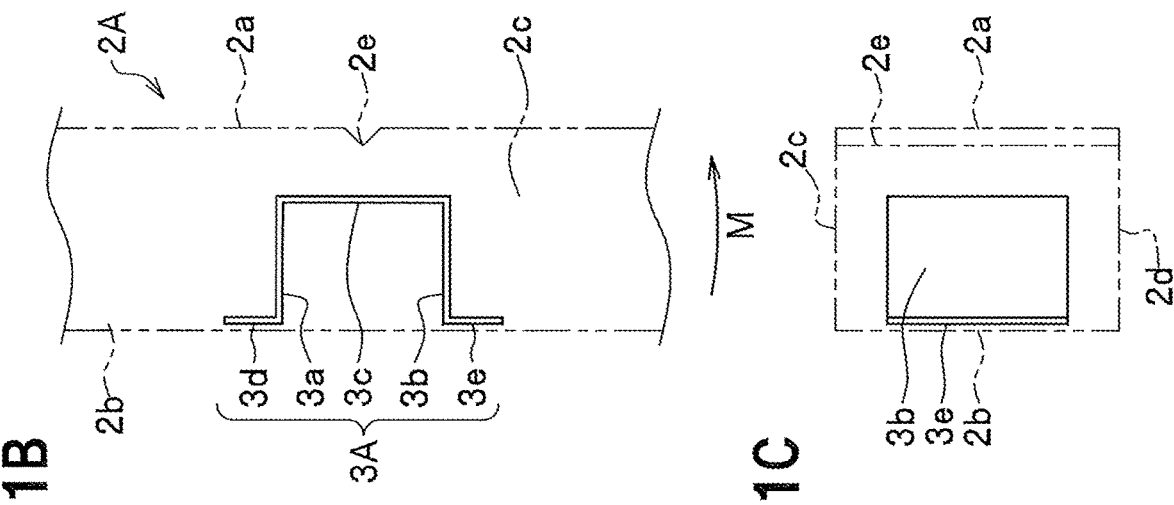
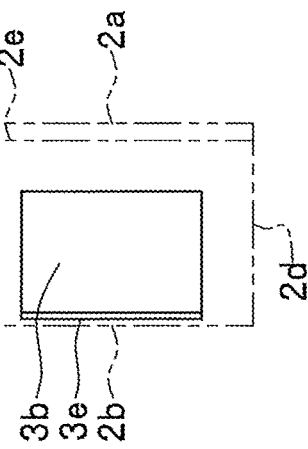
FIG. 1A
FIG. 1B
FIG. 1C

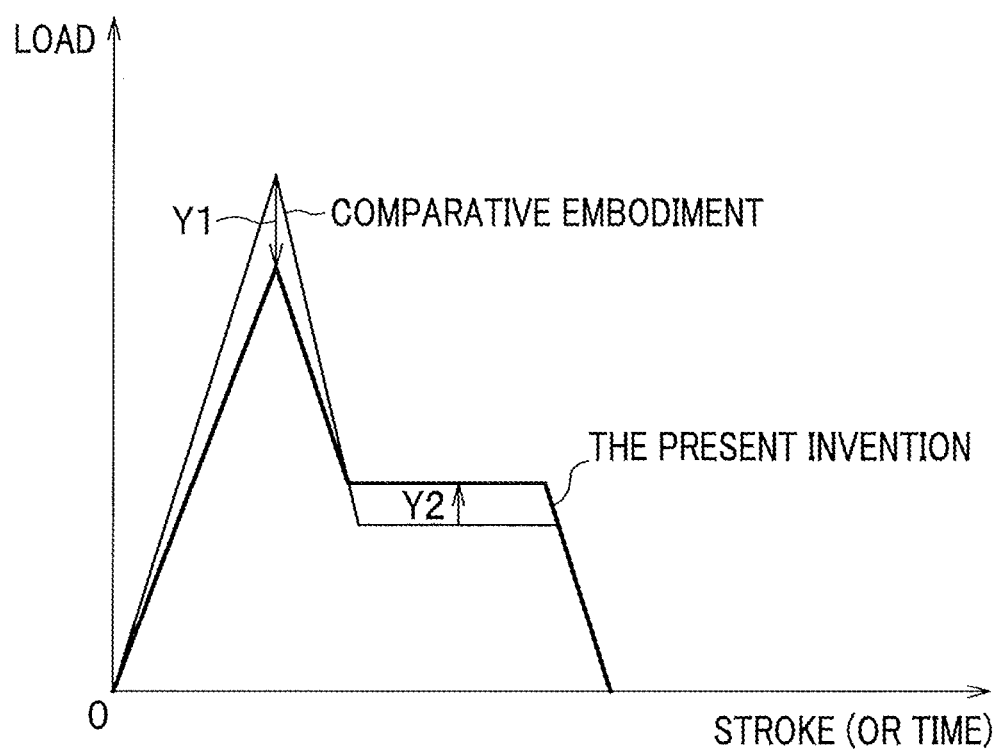

VEHICLE BODY STRUCTURE

TECHNICAL FIELD

The present invention relates to the vehicle body structures of vehicles.

BACKGROUND ART

Vehicle body structures have been known in which at the time of a minimal wrap collision of a vehicle, lateral force is made to be imposed on a front side frame by a power unit arranged on the vehicle width direction inner side relative to the front side frame (see Patent Literatures 1 and 2). Patent Literature 1 discloses a vehicle body structure in which at the time of a minimal wrap collision, an outer spacer outside a front side frame is used to apply a lateral pressure onto an inner spacer inside the front side frame, so that an inner wall section of the front side frame is bent and lateral force is thus generated by a power unit. Patent Literature 2 discloses a vehicle body structure in which at the time of a minimal wrap collision, lateral force is generated by a power unit such that a gusset inside a front side frame comes into contact with the power unit.

CITATION LIST

Patent Literature

Patent Literature 1: Japanese Patent Application Publication No. 2014-162347
Patent Literature 2: Japanese Patent Application Publication No. 2015-9712

SUMMARY OF INVENTION

Technical Problem

Because the vehicle body structures described in Patent Literatures 1 and 2 have a small cross-sectional deformation of the front side frame, the amount of impact energy absorbed by the front side frame is low.

The present invention has been made in light of the above point and addresses the problem of providing a vehicle body structure with which it is possible to advantageously absorb impact energy by the bending of a hollow frame in response to, for example, a front collision and/or an offset collision including the above-described minimal wrap collision.

Solution to Problem

In order to solve the above problem, the present invention provides a vehicle body structure comprising:
a hollow frame that has a substantially rectangular closed cross section and includes a brittle section in a center part in a length direction of one wall section; and
an energy-absorbing member facing the brittle section with a gap therebetween and attached to another wall section that faces the one wall section in the closed cross section of the hollow frame,
the energy-absorbing member comprising
a first wall section and a second wall section erectly provided from the other wall section to the one wall section and
a third wall section connecting a tip end part of the first wall section and a tip end part of the second wall section, wherein the third wall section faces the brittle section with a gap therebetween.

Advantageous Effects of Invention

The vehicle body structure according to the present invention makes it possible to advantageously absorb impact energy by the bending of a hollow frame.

BRIEF DESCRIPTION OF DRAWINGS

FIGS. 1A to 1C are schematic diagrams illustrating a vehicle body structure according to a first embodiment of the present invention. FIG. 1A is a transparent perspective view; FIG. 1B is a transparent plane view; and FIG. 1C is an end view when viewed in the axial direction.

FIG. 2A is a transparent perspective view; FIG. 2B is a transparent plan view; and FIG. 2C is an end view when viewed in the axial direction.

FIG. 3A is a transparent perspective view; FIG. 3B is a transparent plan view; and FIG. 3C is an end view when viewed in the axial direction.

FIG. 4 is a graph showing the relationship between a stroke (or a time) and a load.

DESCRIPTION OF EMBODIMENTS

Figure 2B:
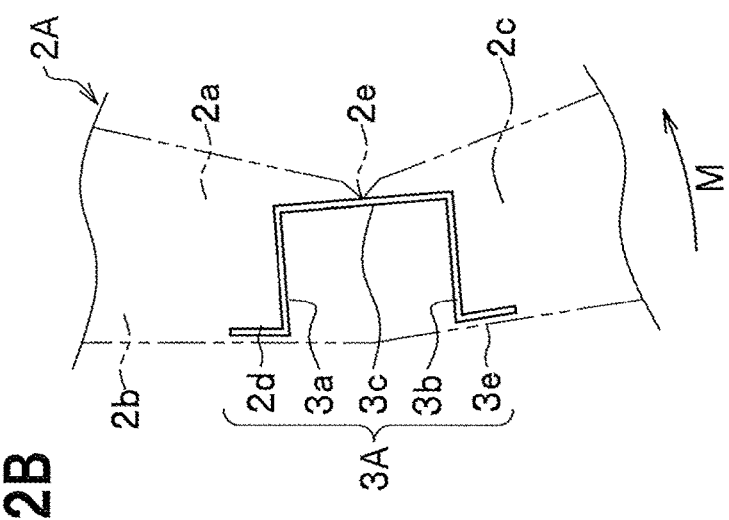
FIGS. 2A to 2C are schematic diagrams illustrating a state where bending deformation occurs in the vehicle body structure according to the first embodiment of the present invention.

Embodiments of the present invention will be described in detail with reference to the Drawings. In the description, the same elements have the same reference numerals so as to avoid redundancy. Note that the "front or rear" indicated by an arrow in each figure denotes the front-rear direction of a vehicle; the "top or bottom" denotes the vertical direction of the vehicle; and the "left or right" denotes the left-right direction (vehicle width direction) when viewed from a driver's seat. In addition, in the following description, a frontal plane refers to a plane including the vertical axis and the left-right axis (i.e., a plane perpendicular to the front-rear axis); a sagittal plane refers to a plane including the vertical axis and the front-rear axis (i.e., a plane perpendicular to the left-right axis); and a horizontal plane refers to a plane including the front-rear axis and the left-right axis (i.e., a plane perpendicular to the vertical axis).

First Embodiment

As shown in FIGS. 1A to 1C, a vehicle body structure 1A according to the first embodiment of the present invention is provided with a hollow frame 2A and an energy-absorbing member 3A.
<Hollow Frame>
The hollow frame 2A is a metal structural member that presents a substantially rectangular closed cross section. The hollow frame 2A has a brittle section 2e formed at one wall section 2a.

The brittle section 2e is a site on which stress is concentrated and is thus crushed preferentially when a collision load is applied on one end portion of the hollow frame 2A. The brittle section 2e is formed at a center part in the length direction of the one wall section 2a of the hollow frame 2A. The brittle section 2e is formed by, for example, a thin wall part, such as a recessed groove which is recessed inwardly of the hollow frame 2A, extending in a direction perpendicular to the length direction of the hollow frame 2A.
<Energy-Absorbing Member>
The energy-absorbing member 3A is a member that absorbs impact energy by the bending of the hollow frame 2A such that when a collision load is input to one end portion of the hollow frame 2A, the member comes into contact with the brittle section 2e and is thus crushed and deformed. The energy-absorbing member 3A is a metal member that has an approximate hat-shaped cross section when viewed in a direction perpendicular to the length direction of the hollow frame 2A. The energy-absorbing member 3A is provided inside the hollow frame 2A and is attached to another wall section 2b facing the one wall section 2a. The energy-absorbing member 3A is apart from both wall sections 2c and 2d that connect the one wall section 2a and the other wall section 2b. The energy-absorbing member 3A is integrally provided with a first wall section 3a, a second wall section 3b, a third wall section 3c, a flange section 3d, and a flange section 3e.

The first wall section 3a is provided on the one end portion side, relative to the brittle section 2e, of the hollow frame 2A and extends from the other wall section 2b to the one wall section 2a. The second wall section 3b is provided on the other end portion side, relative to the brittle section 2e, of the hollow frame 2A and extends from the other wall section 2b to the one wall section 2a.

The third wall section 3c connects the tip end part of the first wall section 3a and the tip end part of the second wall section 3b and extends in the length direction of the hollow frame 2A. The third wall section 3c faces and is apart from the one wall section 2a including the brittle section 2e.

The flange section 3d extends from a base end portion of the first wall section 3a toward the one end portion side of the hollow frame 2A, and is joined by, for instance, welding onto the other wall section 2b of the hollow frame 2A. The flange section 3e extends from a base end portion of the second wall section 3b toward the other end portion side of the hollow frame 2A, and is joined by, for instance, welding onto the other wall section 2b of the hollow frame 2A.

The first wall section 3a, the second wall section 3b, and the third wall section 3c define a groove section that has the third wall section 3c as a bottom surface and extends in a direction (e.g., a vertical direction) perpendicular to the longitudinal direction of the hollow frame 2A. Both ends in the axial direction of such a groove section each have an opening.

Meanwhile, the depth of the groove section of the energy-absorbing member 3A (i.e., the distance between the other wall section 2b and the third wall section 3c) is set to be larger than half the distance between the other wall section 2b and the one wall section 2a. This setting allows the wall sections 2c and 2d to come into contact with the energy-absorbing member 3A (specifically, both edge portions of the first wall section 3a and the second wall section 3b) when the wall sections 2c and 2d are deformed so as to be recessed inwardly of the hollow frame 2A (see FIG. 2C).
<Deformation of Hollow Frame and Energy-Absorbing Member by Collision Load>
The hollow frame 2A is structured such that the one wall section 2a has the brittle section 2e. Accordingly, when a load is applied from the one end portion of the hollow frame 2A by, for instance a vehicle collision, this load acts as a bending moment M on the hollow frame 2A. As shown in FIGS. 2A and 2B, this bending moment M causes the one wall section 2a of the hollow frame 2A to be bent at the brittle section 2e so as to be recessed inwardly of the hollow frame 2A. Here, when there is no energy-absorbing member in conventional cases (the comparative embodiment of FIG. 4), the hollow frame alone has to be used to absorb energy. Such energy absorption requires a sufficient yield strength for the bending moment M. Because of this, each conventional hollow frame has a larger plate thickness so as to increase the strength. Thus, a peak value of a load (peak load) imposed initially on the hollow frame when the hollow frame is bent is large; and a load average (average load) after the bending is small. By contrast, the vehicle body structure 1A according to this embodiment absorbs more energy than the conventional cases without any energy-absorbing member (the comparative embodiment of FIG. 4) because of the hollow frame 2A and the energy-absorbing member 3A disposed inside thereof absorb the energy. This structure makes it possible to decrease the plate thickness of the hollow frame 2A, reduce the weight, and set the strength lower. Hence, use of the vehicle body structure 1A according to this embodiment can reduce (can decrease) the peak value of a load (peak load) imposed initially on the hollow frame 2A (see the arrow Y1 of FIG. 4).

Figure 2C:
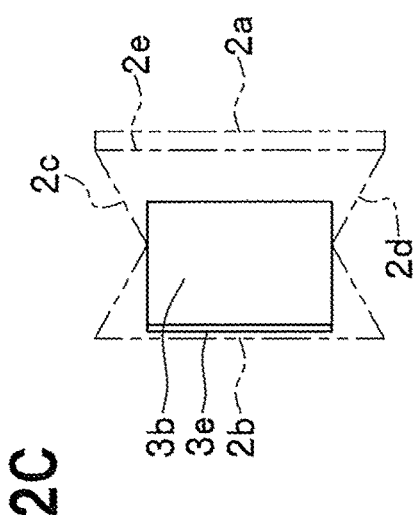
Figure 2A:
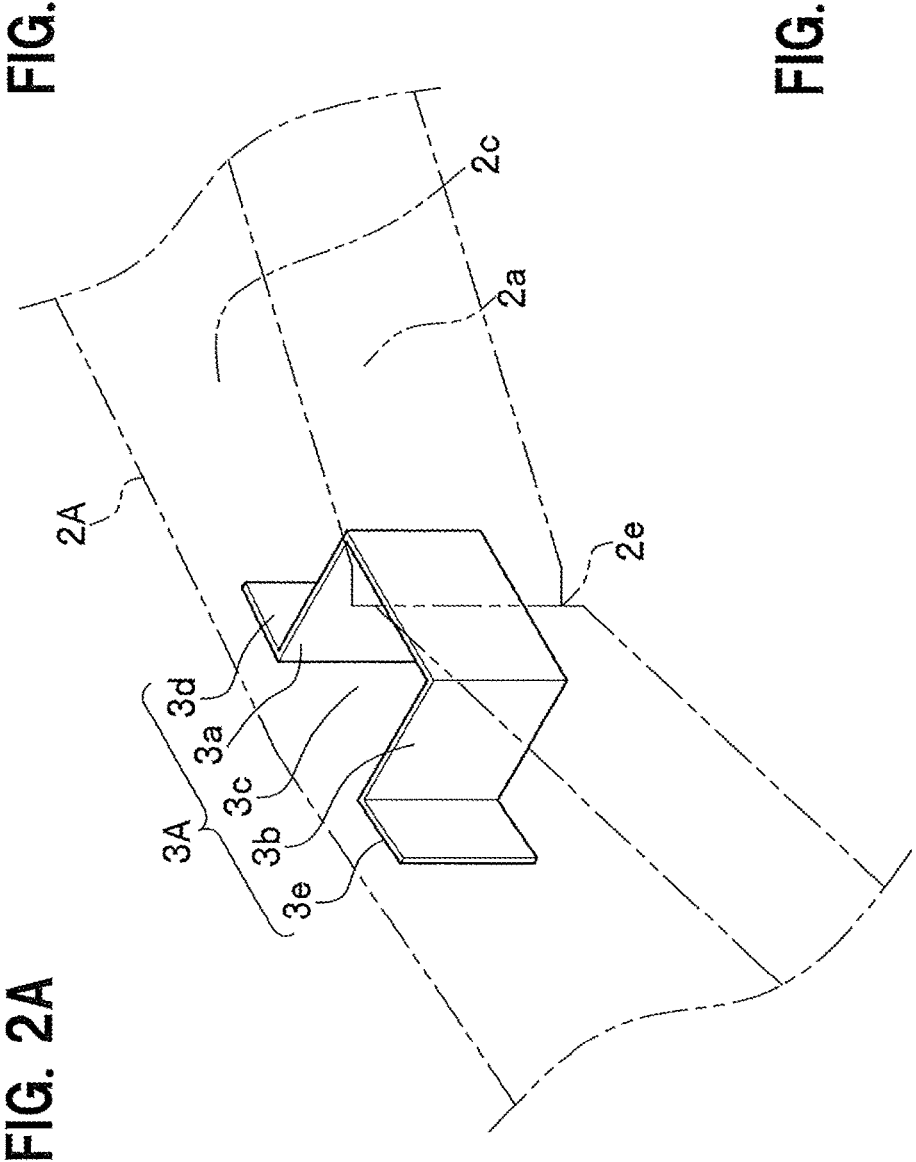

In addition, as shown in FIG. 2C, the bending moment M causes the wall sections 2c and 2d of the hollow frame 2A to be bent at the center part in the width direction so as to be convex inwardly of the hollow frame 2A. Accordingly, use of the hollow frame 2A can also reduce the peak value of a load (peak load) imposed on the hollow frame 2A (see the arrow Y1 of FIG. 4).

Subsequently, the bent brittle section 2e comes into contact with the third wall section 3c of the energy-absorbing member 3A. In addition, the bent wall sections 2c and 2d each come into contact with the energy-absorbing member 3A (in particular, both edge portions of the first wall section 3a and the second wall section 3b). Note that the size relationship between the energy-absorbing member 3A and the hollow frame 2A is desirably set such that the contact between the brittle section 2e and the third wall section 3c and the contact between the wall sections 2c and 2d and both edge portions of the first wall section 3a and the second wall section 3b occur simultaneously.

Figure 3A:
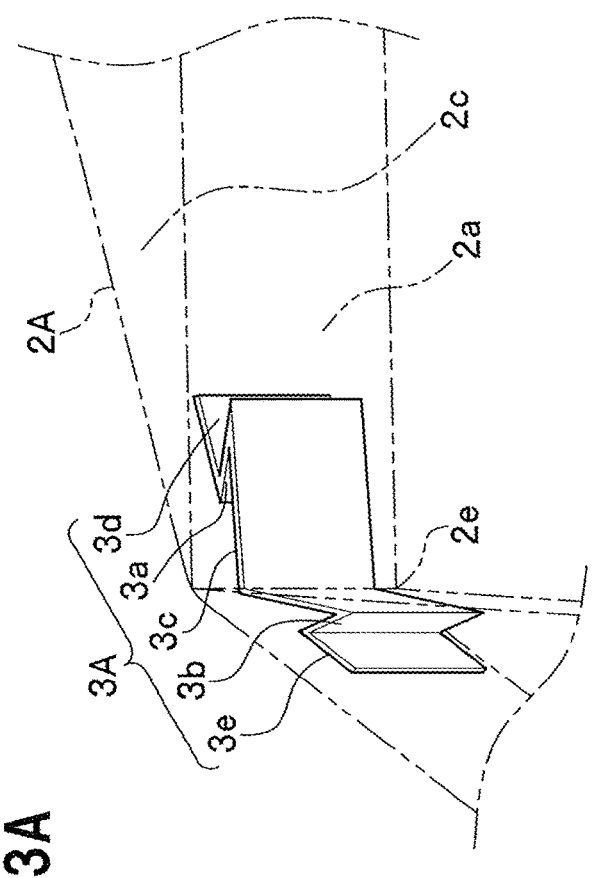
FIGS. 3A to 3C are schematic diagrams illustrating a state where further bending deformation occurs in the vehicle body structure according to the first embodiment of the present invention.
Figure 3B:
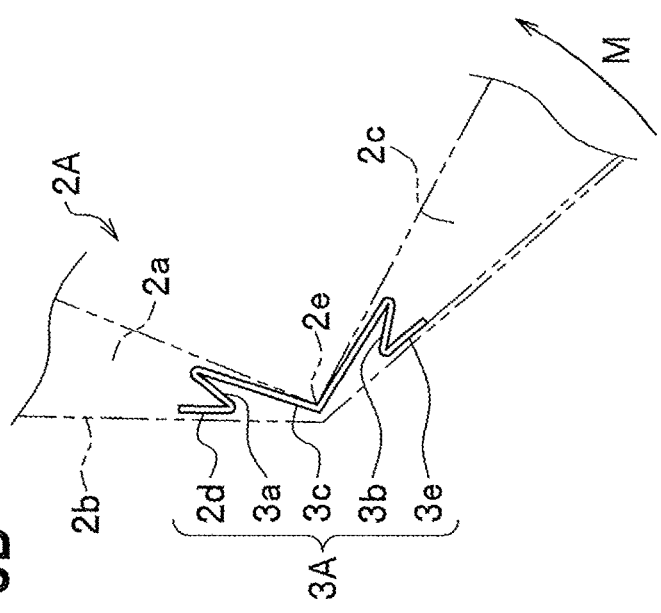

Then, as shown in FIGS. 3A and 3B, while pressurized by the brittle section 2e, the energy-absorbing member 3A is crushed and deformed. Here, the energy-absorbing member 3A absorbs energy while being crushed and deformed, which increases the average of a load (average load) imposed on the hollow frame 2A (see the arrow Y2 of FIG. 4).

Figure 3C:
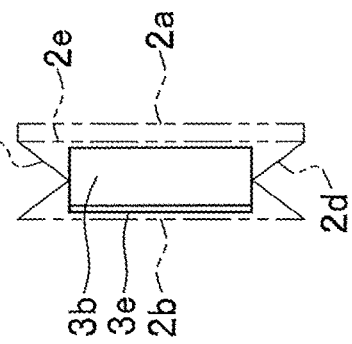

In addition, as shown in FIG. 3C, the energy-absorbing member 3A restricts further bending of the wall sections 2c and 2d. Accordingly, the energy-absorbing member 3A can increase the average of a load (average load) imposed on the hollow frame 2A (see the arrow Y2 of FIG. 4).

The vehicle body structure 1A according to the first embodiment of the present invention is provided with the brittle section 2e and the energy-absorbing member 3A, which reduces the peak load and increases the average load. Consequently, this can improve the impact energy absorption performance.

In addition, the energy-absorbing member 3A of the vehicle body structure 1A faces each of the wall sections 2c and 2d, which connect the one wall section 2a and the other wall section 2b, with a gap therebetween. The energy-absorbing member 3A can first permit deformation such that both the wall sections 2c and 2d are recessed and then restrict the deformation, thereby reducing the peak load and increasing the average load. Consequently, this can improve the impact energy absorption performance.

Second Embodiment

Subsequently, differences between the vehicle body structure 1A according to the first embodiment and that of the second embodiment of the present invention are mainly explained.

Figure 5:
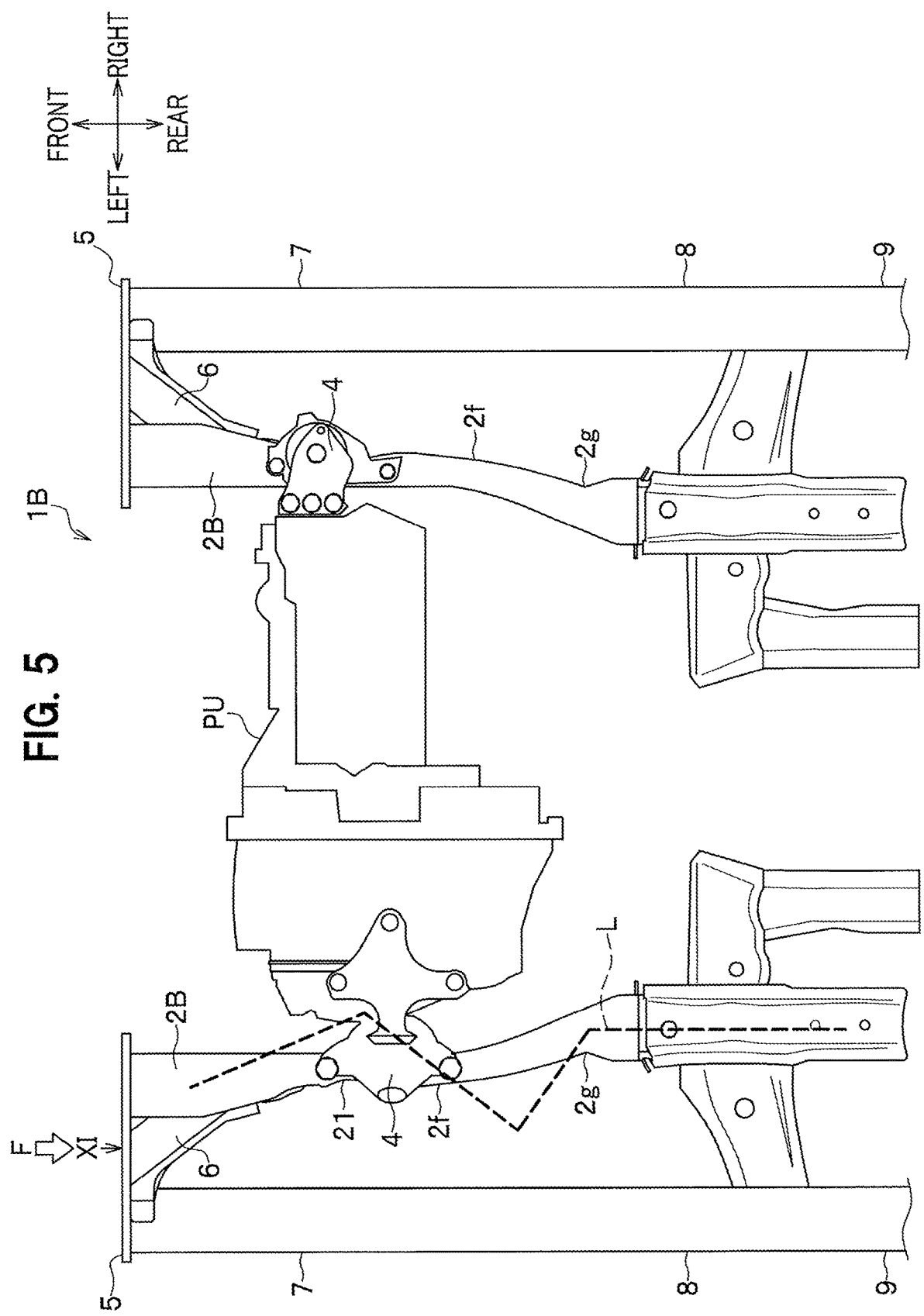
FIG. 5 is a plan view showing a vehicle body structure according to a second embodiment of the present invention.

As shown in FIG. 5, a vehicle body structure 1B according to the second embodiment of the present invention includes a pair of left and right members: front side frames 2B; energy-absorbing members 3B (see FIGS. 6 and 9); mounts 4 (left-side transmission mount 4 and right-side engine mount 4); bumper beam mounting plates 5; load receiving members 6; lower members (sometimes referred to as lower arms or lower frames) 7; upper members (sometimes referred to as upper arms or upper frames) 8; and front pillars 9.

<Front Side Frame>

Figure 8:
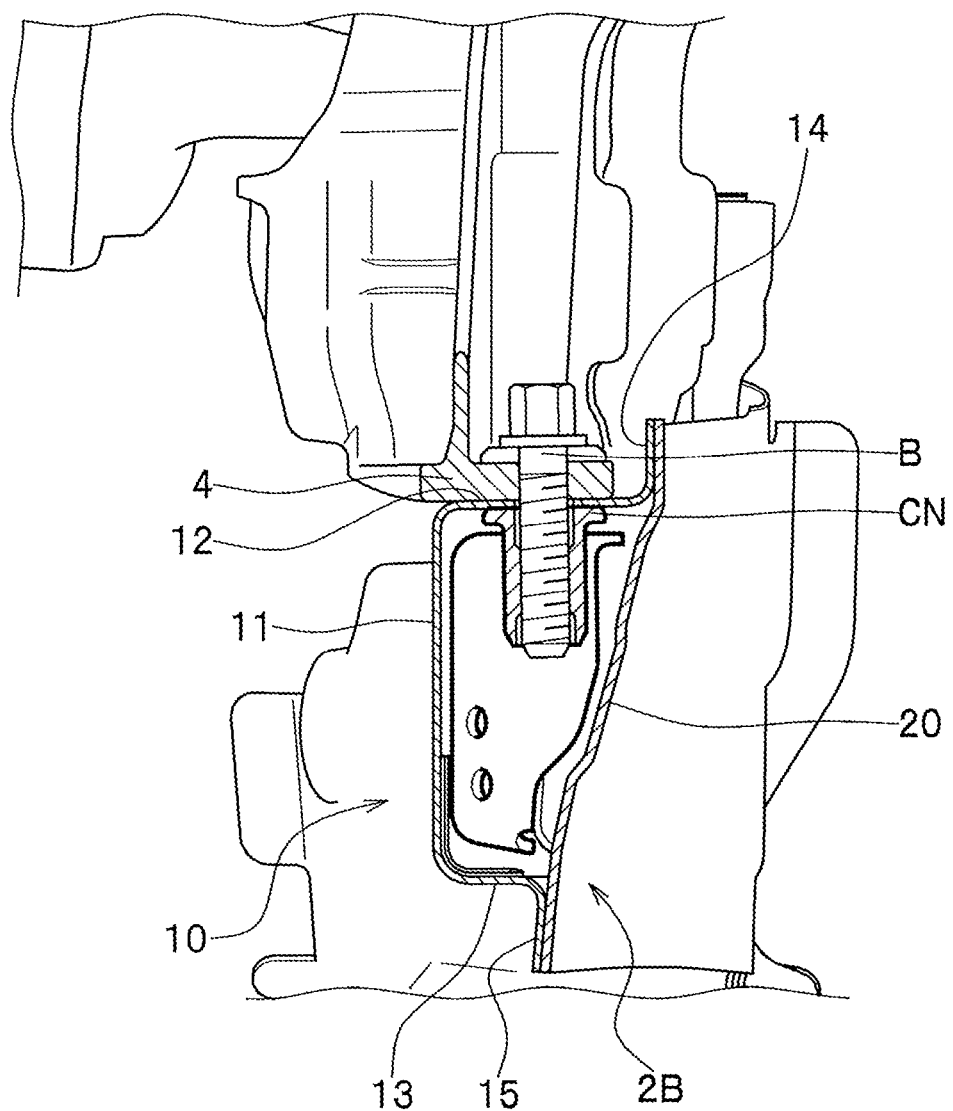
FIG. 8 is a cross-sectional view taken along line VIII-VIII of FIG. 7.

The front side frame 2B is a metal structural member that extends in the front-rear direction. The front side frame 2B is formed by assembling rolled steel sheet pressed products, etc., having, for instance, a U-shaped cross section to give a hollow structure that presents a closed cross section in a frontal plane. Specifically, as shown in FIG. 8, the front side frame 2B is composed of: an inner panel 10 having an approximately hat-shaped cross section or an approximately U-shaped cross section; and an approximately flat plate-shaped outer panel 20.

<<Inner Panel>>

The inner panel 10 is an approximately hat-shaped or U-shaped metal member having an opening section at an outer end in the vehicle width direction in a front view. The inner panel 10 is integrally provided with an inner wall section 11, an upper wall section 12, a lower wall section 13, a flange section 14, and a flange section 15

The inner wall section 11 extends in the sagittal direction and constitutes an inner wall section of the front side frame 2B. The inner wall section 11 corresponds to the other wall section 2b of the first embodiment.

The upper wall section 12 extends, from an upper end portion of the inner wall section 11, outwardly in the vehicle width direction, and constitutes an upper wall section of the front side frame 2B. The upper wall section 12 corresponds to the wall section 2c of the first embodiment.

The lower wall section 13 extends, from a lower end portion of the inner wall section 11, outwardly in the vehicle width direction, and constitutes a lower wall section of the front side frame 2B. The size of the lower wall section 13 in the vehicle width direction is set to be smaller than the size of the upper wall section 12 in the vehicle width direction. The lower wall section 13 corresponds to the wall section 2d of the first embodiment.

The flange section 14 extends upwardly of an outer end portion in the vehicle width direction of the upper wall section 12, and is joined by, for instance, welding onto an upper end portion of the outer panel 20. The flange section 15 extends downwardly of an outer end portion in the vehicle width direction of the lower wall section 13, and is joined by, for instance, welding onto a lower end portion of the outer panel 20.

<<Outer Panel>>

The outer panel 20 is a metal member constituting an outer wall section of the front side frame 2B. The outer panel 20 is attached to the inner panel 10 such that the opening section of the inner panel 10 is covered. The outer panel 20 corresponds to the one wall section 2a of the first embodiment.

The outer panel 20 is tilted outwardly in the vehicle width direction as the position becomes higher. That is, the frontal cross section of the front side frame 2B is formed such that the cross section becomes wider in the upward direction so as to conform with an upper inner-side shape of a front wheel (tire).

The outer panel 20 is provided with a brittle section 21. The brittle section 21 is formed at a center part in the length direction of the outer panel 20. The brittle section 21 extends in a direction perpendicular to the length direction of the outer panel 20 and is a recessed portion that is recessed inwardly in the vehicle width direction (inwardly of the front side frame 2B). The recessed brittle section 21 is a site provided so as to avoid interference with a front wheel (not shown), which is disposed on the outer side in the vehicle width direction of the front side frame 2B, when the wheel is turned.

<Left-Side Energy-Absorbing Member>

Figure 6:
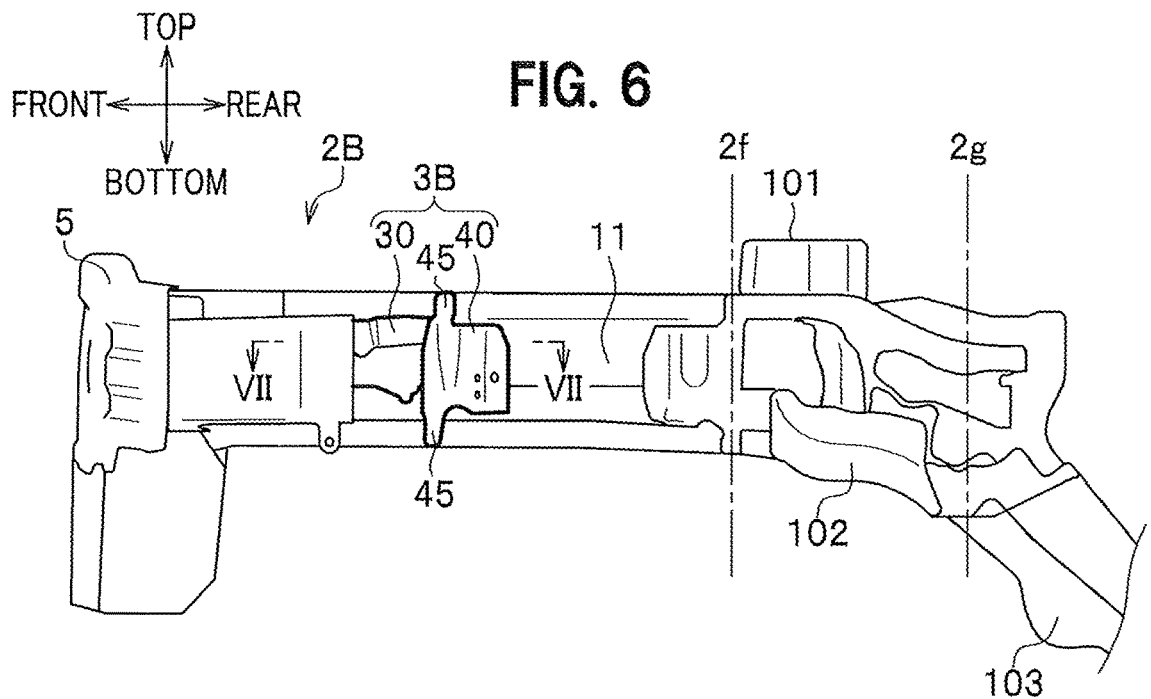
FIG. 6 is a side view when a left front side frame is viewed from the outside in the vehicle width direction and is a diagram viewed through an outer panel is transparent.
Figure 7:
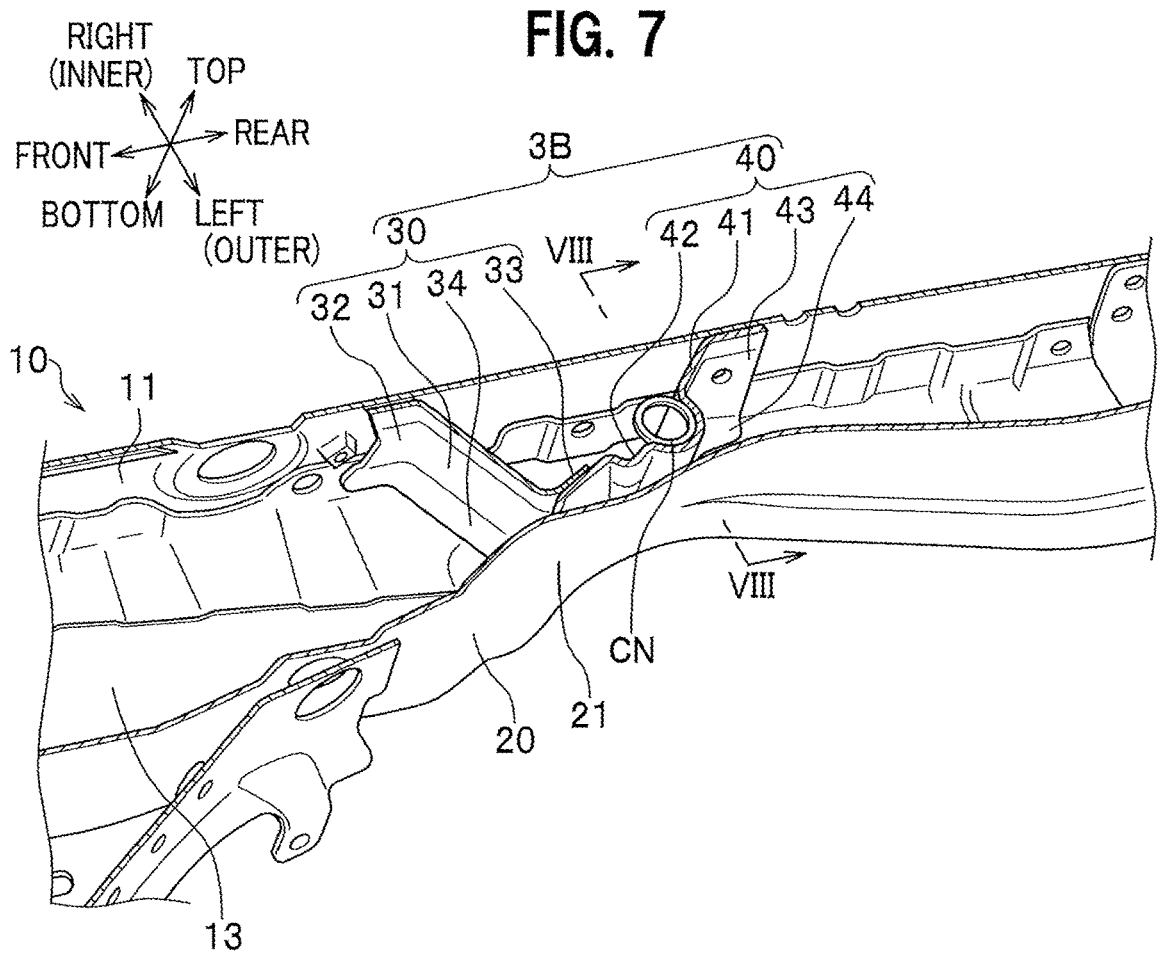
FIG. 7 is a cross-sectional view taken along line VII-VII of FIG. 6.

As shown in FIGS. 6 and 7, the left-side energy-absorbing member 3B includes a front member 30, a rear member 40, and a collar nut CN. Specifically, the left-side energy-absorbing member 3B is structured by combining two members: the front member 30 and the rear member 40, and serves as a mount attachment bracket by further including the collar nut CN.

<<Front Member>>

The front member 30 is a metal member constituting a portion (a front portion) of the left-side energy-absorbing member 3B. The front member 30 is integrally provided with a first wall section 31, a flange section 32, a flange section 33, and a bending section 34.

The first wall section 31 extends, from the inner wall section 11, outwardly in the vehicle width direction. In this embodiment, the first wall section 31 is tilted rearwardly as the distance to the outside in the vehicle width direction becomes shorter, and is tilted forwardly as the position becomes higher.

The flange section 32 extends forwardly of an inner end portion in the vehicle width direction of the first wall section 31, and is joined by, for instance, welding onto the inner wall section 11. The flange section 33 extends rearwardly of an outer end portion in the vehicle width direction of the first wall section 31, and is joined by, for instance, welding onto an inner surface in the vehicle width direction of a third wall section 42 of the rear member 40. The bending section 34 extends, from lower end portions of the first wall section 31, the flange section 32, and the flange section 33, outwardly in the vehicle width direction.

<<Rear Member>>

The rear member 40 is a metal member constituting the rest (an intermediate portion and a rear portion) of the left-side energy-absorbing member 3B. The rear member 40 is integrally provided with a second wall section 41, the third wall section 42, a flange section 43, and a bending section 44.

The second wall section 41 extends, from the inner wall section 11, outwardly in the vehicle width direction. In this embodiment, the second wall section 41 is tilted forwardly as the distance to the outside in the vehicle width direction becomes shorter, and is tilted rearwardly as the position becomes higher. The third wall section 42 extends forwardly of an inner end portion in the vehicle width direction of the second wall section 41. In this embodiment, the third wall section 42 is tilted outwardly in the vehicle width direction as the distance to the front end becomes shorter, and is tilted outwardly in the vehicle width direction as the position becomes higher.

The flange section 43 extends rearwardly of a rear-end portion of the second wall section 41, and is joined by, for instance, welding onto the inner wall section 11. The bending section 44 extends, from lower end portions of the second wall section 41, the third wall section 42, and the flange section 43, outwardly in the vehicle width direction.

The collar nut CN is attached to an upper end portion of a corner between the second wall section 41 and the third wall section 42.

The third wall section 42 is formed such that the distance from the inner wall section 11 increases as the position becomes higher. The same applies to the right-side energy-absorbing member 3B.

The bending sections 34 and 44 are provided so as to suppress a crash/deformation of the left-side energy-absorbing member 3B. The left-side energy-absorbing member 3B is provided with the bending sections 34 and 44, which are used to produce reaction force that suppresses the crash/deformation. This can reduce the plate thickness and increase the average load. Note that instead of the bending sections 34 and 44, structures shaped like a ridgeline-forming step, a groove section, or a bead may be used as crash/deformation-suppressing structures for the front member 30 and the rear member 40 of the left-side energy-absorbing member 3B.

In addition, as shown in FIG. 6, the rear member 40 is provided with a pair of upper and lower extension pieces (tongue pieces) 45 and 45 that extend upwardly and downwardly of a front-end portion of the third wall section 42 (i.e., a site where the flange section 33 of the front member 30 is joined). The upper extension piece 45 is sandwiched between the flange section 14 of the inner panel 10 and the outer panel 20, and is joined by, for instance, welding onto each of the flange section 14 of the inner panel 10 and the outer panel 20. The lower extension piece 45 is sandwiched between the flange section 15 of the inner panel 10 and the outer panel 20, and is joined by, for instance, welding onto each of the flange section 15 of the inner panel 10 and the outer panel 20. Such a configuration makes it possible to increase the support rigidity (in the vertical direction) of a mount 4, which is secured using the collar nut CN of the rear member 40.

Meanwhile, the first wall section 31, the second wall section 41, and the third wall section 42, except for the upper and lower extension pieces 45, and each of the upper wall section 12 and the lower wall section 13 of the front side frame 2B have a gap therebetween. This configuration can reduce the initial peak load during a collision and increase the average load.

<Right-Side Energy-Absorbing Member>

Figure 9:
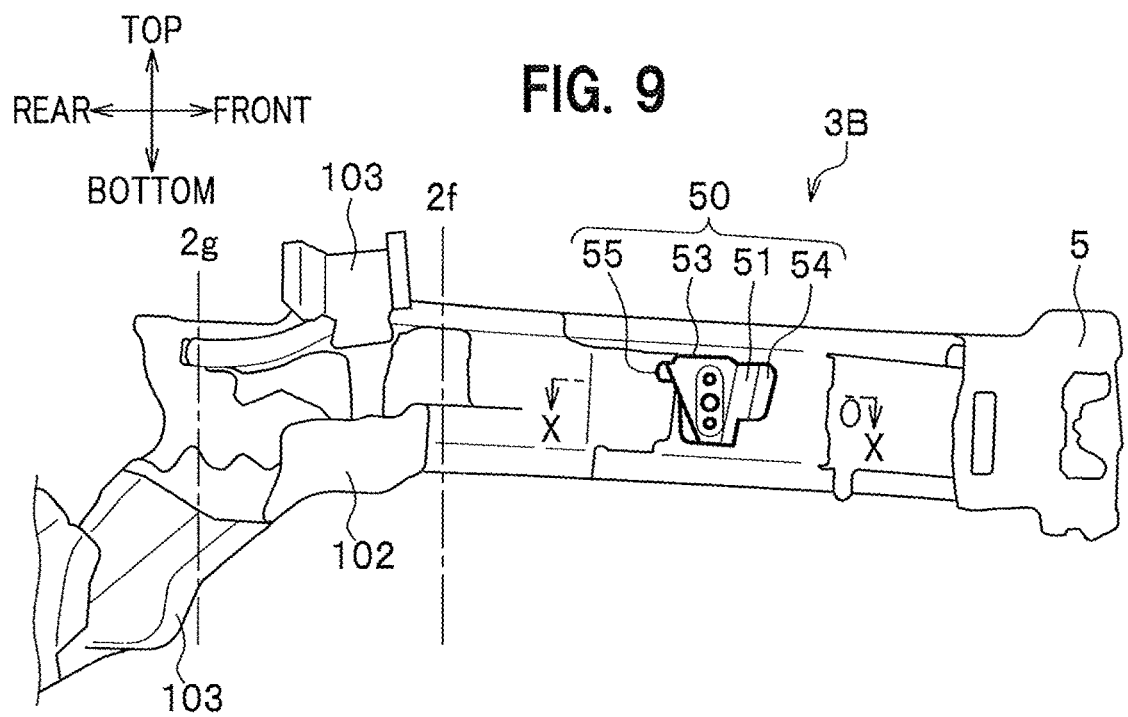
FIG. 9 is a side view when a right front side frame is viewed from the outside in the vehicle width direction and through an outer panel.
Figure 10:
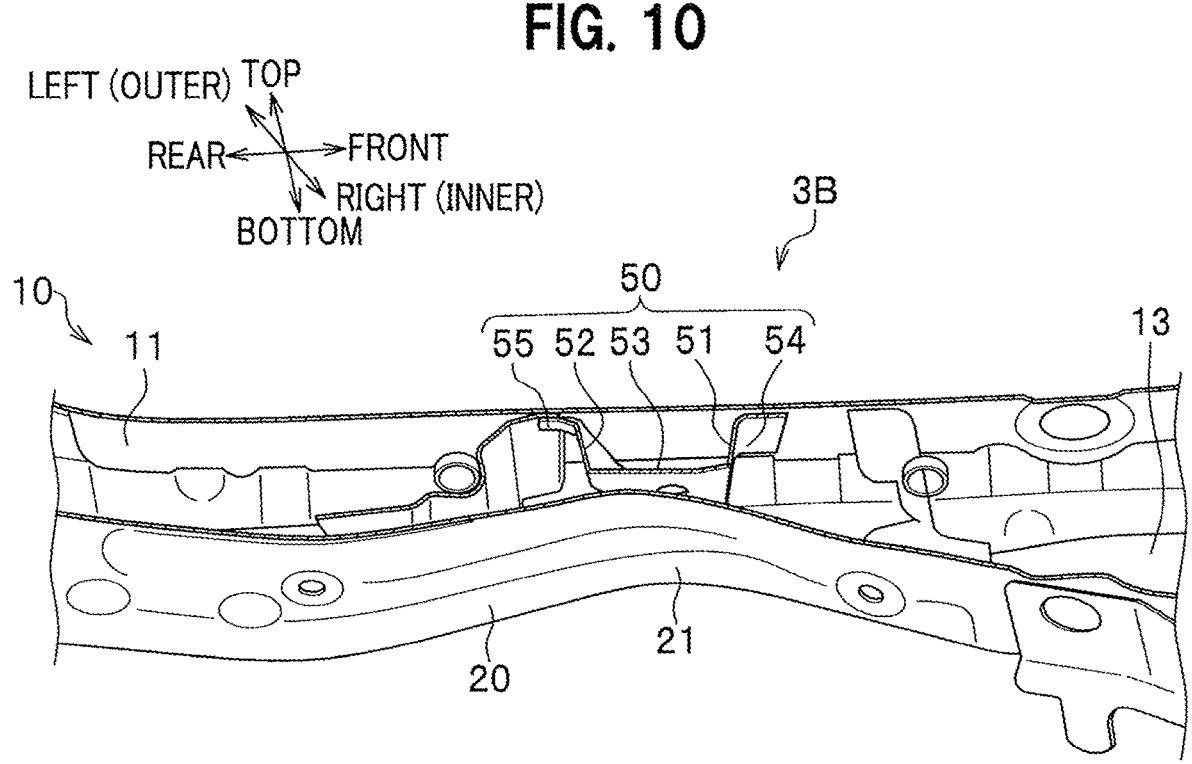
FIG. 10 is a cross-sectional view taken, along line X-X of FIG. 9.

As shown in FIGS. 9 and 10, the right-side energy-absorbing member 3B is composed of one member 50. The member 50 is a metal member constituting all of the right-side energy-absorbing member 3B. The member 50 is integrally provided with a first wall section 51, a second wall section 52, a third wall section 53, a flange section 54, and a flange section 55.

The first wall section 51 extends, from the inner wall section 11, outwardly in the vehicle width direction. In this embodiment, the first wall section 51 is tilted rearwardly as the distance to the outside in the vehicle width direction becomes shorter, and is tilted forwardly as the position becomes higher.

The second wall section 52 extends, from the inner wall section 11, outwardly in the vehicle width direction. In this embodiment, the second wall section 52 is tilted forwardly as the distance to the outside in the vehicle width direction becomes shorter, and is tilted rearwardly as the position becomes higher.

The third wall section 53 bridges a gap between the tip end part of the first wall section 51 and the tip end part of the second wall section 52. In this embodiment, the third wall section 53 is tilted outwardly in the vehicle width direction as the distance to the front end becomes shorter, and is tilted outwardly in the vehicle width direction as the position becomes higher.

The flange section 54 extends forwardly of an inner end portion in the vehicle width direction of the first wall section 51, and is joined by, for instance, welding onto the inner wall section 11. The flange section 55 extends rearwardly of a rear-end portion of the second wall section 52, and is joined by, for instance, welding onto the inner wall section 11.

As shown in FIG. 9, the first wall section 51 and the second wall section 52 are formed such that the distance therebetween increases as the position becomes higher. The same applies to the left-side energy-absorbing member 3B.

<Bending Deformation Allowable Section (Brittle Section and Bending Section) of Front Side Frame>

As shown in FIG. 5, the front side frame 2B includes: the brittle section 21 as a first bending deformation allowable section; a first bending section 2f as a second bending deformation allowable section; and a second bending section 2g as a third bending deformation allowable section.

The first bending deformation allowable section 21 is a bending deformation allowable site that is bent so as to be inwardly convex in the vehicle width direction in a planar view at the time of a front collision (in particular, a narrow offset collision), and is composed of the brittle section 21 in this embodiment.

The second bending deformation allowable section 2f is a bending deformation allowable (bending deformable) site that is bent, at a position at rear of the first bending deformation allowable section (brittle section) 21, outwardly in the vehicle width direction in a planar view at the time of a front collision (in particular, a narrow offset collision), and is composed of the first bending section 2f in this embodiment. The first bending section 2f is a bending formation site that is bent, at a position at rear of the first bending deformation allowable section (brittle section) 21, outwardly in the vehicle width direction in a planar view. In particular, the bending is formed such that the inner wall section 11 is bent, at the first bending section 2f, outwardly in the vehicle width direction in a planar view.

The third bending deformation allowable section 2g is a bending deformation allowable (bending deformable) site that is bent, at a position at rear of the second bending deformation allowable section (first bending section) 2g, inwardly in the vehicle width direction in a planar view at the time of a front collision (in particular, a narrow offset collision, and is composed of the second bending section 2g in this embodiment. The second bending section 2g is a bending formation site that is bent, at a position at rear of the second bending deformation allowable section (first bending section) 2f, inwardly in the vehicle width direction in a planar view. In particular, the bending is formed such that the outer panel 20, which is the outer wall section, is bent, at the second bending section 2g, inwardly in the vehicle width direction in a planar view.

As shown in FIG. 6, in the left front side frame 2B, a site that is at rear of the second bending deformation allowable section (first bending section) 2f (and is in front of the third bending deformation allowable section (second bending section) 2g) is reinforced by a stiffener 101 and a patch 102, so that the rigidity is higher than that of the second bending deformation allowable section (first bending section) 2f. In addition, in the front side frame 2B, a site that is at rear of the third bending deformation allowable section (second bending section) 2g is reinforced by a patch 103, so that the rigidity is higher than that of the third bending deformation allowable section (second bending section) 2g. Here, the stiffener 101 is a metal member attached to the inner wall section 11 of the front side frame 2B; and the patch 103 is a metal member attached to the outer panel 20 (outer wall section) of the front side frame 2B. The same applies to the right front side frame 2B.

<Mount>

As shown in FIG. 5, the mounts 4 are members that support a power unit PU, which includes a vehicle power source, provided between a pair of the left and right front side frames 2B and 2B. As shown in FIG. 8, the left-side mount 4 is placed on the upper wall section 12 of the left front side frame 2B and is secured, from above, to the collar nut CN by using a bolt B.

<Bumper Beam Mounting Plate>

As shown in FIG. 5, the bumper beam mounting plate 5 is a metal plate-like member attached to a front-end portion of the front side frame 2B. A bumper beam (not shown) is provided, as a bridge, between front surfaces of a pair of the left and right bumper beam mounting plates 5 and 5. The bumper beam (not shown) is secured via the bumper beam mounting plate 5 to a front end portion of each of the front side frame 2B, the load receiving member 6, and the lower member 7 by using bolts. Note that the bumper beam mounting plate 5 may be connected, via a separate flange member or a vertical frame member of a front bulk head, to the front-end portion of the front side frame 2B.

<Load Receiving Member>

The load receiving member 6 is a metal member attached to an outer end portion in the vehicle width direction of a front-end portion of the front side frame 2B. The load receiving member 6 is a member that receives a front collision load and then transmits the load to the front side frame 2B in the case of what is called a narrow offset collision (also referred to as a minimal wrap collision), that is, the case where the vehicle body structure 1B receives the front collision load only at a site on the vehicle width direction outer side of the front side frame 2B. The load receiving member 6, together with the outer panel 20, has a closed cross section in a frontal plane direction. In addition, the load receiving member 6 presents an approximately right triangular shape in a planar view. Specifically, the load receiving member 6 is configured such that one side of a font end portion is perpendicular to one side of an inner end portion and one side of an outer end portion is tilted inwardly in the vehicle width direction as the distance to the rear end becomes shorter.

<<Front End Portion of Outer Panel>>

Figure 11:
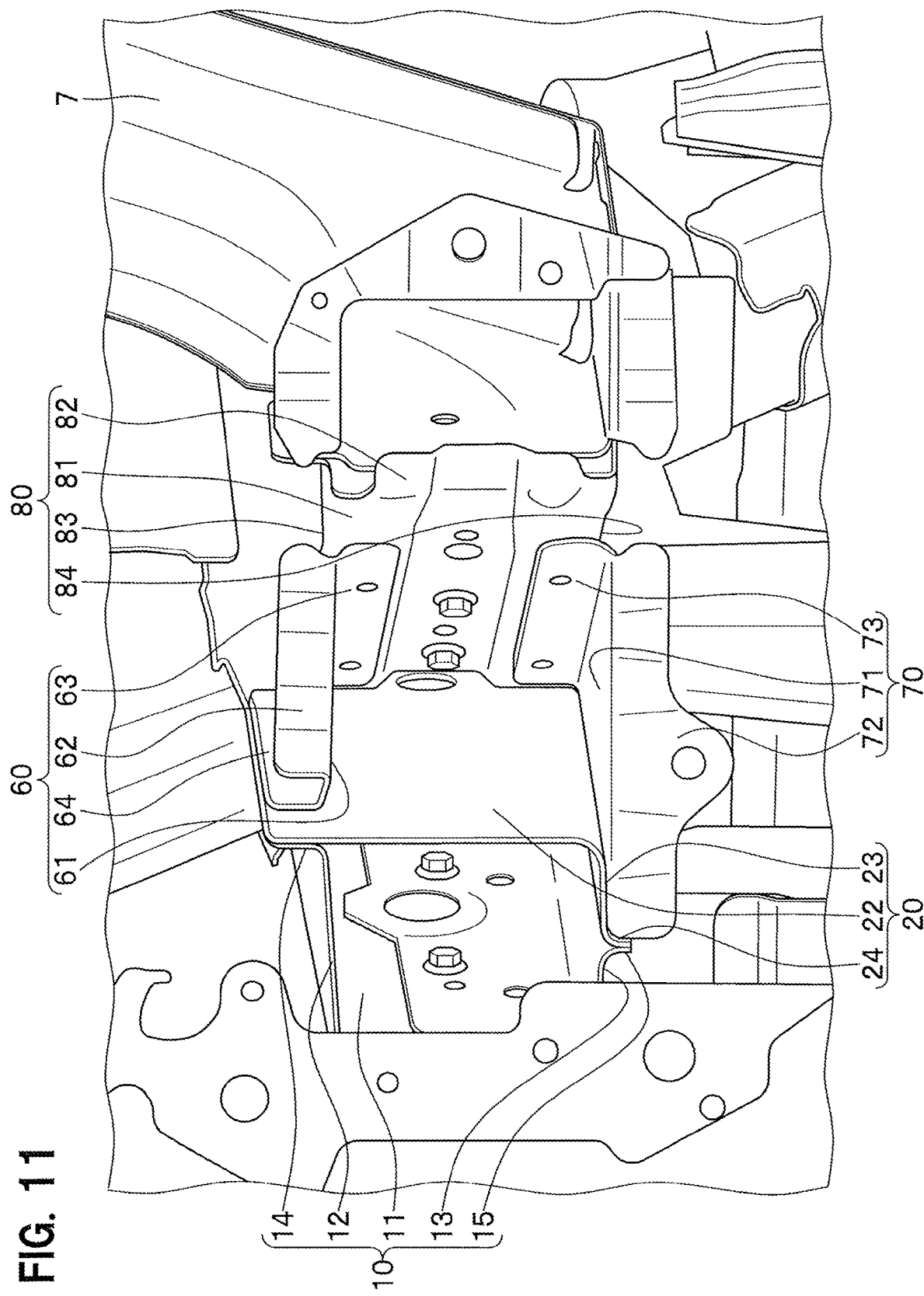
FIG. 11 is an XI sagittal view of FIG. 5 and is a diagram illustrating a state where a bumper beam mounting plate has been removed.

As shown in FIG. 11, a front-end portion of the outer panel 20 is integrally provided with an outer wall section 22, a lower wall section 23, and a flange section 24.

The outer wall section 22 extends in the sagittal direction and constitutes an outer wall section of the front side frame 2B.

The lower wall section 23 extends, from a lower end portion of the outer wall section 22, inwardly in the vehicle width direction, and constitutes a lower wall section of the front side frame 2B.

The flange section 24 extends downwardly of an inner end portion in the vehicle width direction of the lower wall section 13, and is joined by, for instance, welding onto the flange section 15 of the inner panel 10.

<Specific Structure of Load Receiving Member>

As shown in FIG. 11, the load receiving member 6 includes a top member 60, a bottom member 70, and an outer member 80.

<<Top Member>>

The top member 60 is integrally provided with an upper wall section 61, a flange section 62, a flange section 63, and a flange section 64.

The upper wall section 61 extends in the horizontal direction and constitutes an upper wall section of the load receiving member 6.

The flange section 62 extends upwardly of a front-end portion of the upper wall section 61 and comes into contact with the bumper beam mounting plate 5.

The flange section 63 extends downwardly of an outer end portion in the vehicle width direction of the upper wall section 61, and is secured, using a bolt(s), to an outer wall section 81 of the outer member 80.

The flange section 64 extends upwardly of an inner end portion in the vehicle width direction of the upper wall section 61, and is joined by, for instance, welding onto the outer wall section 22 of the outer panel 20.

<<Bottom Member>>

The bottom member 70 is integrally provided with a lower wall section 71, a flange section 72, a flange section 73, and a flange section 74.

Figure 12:
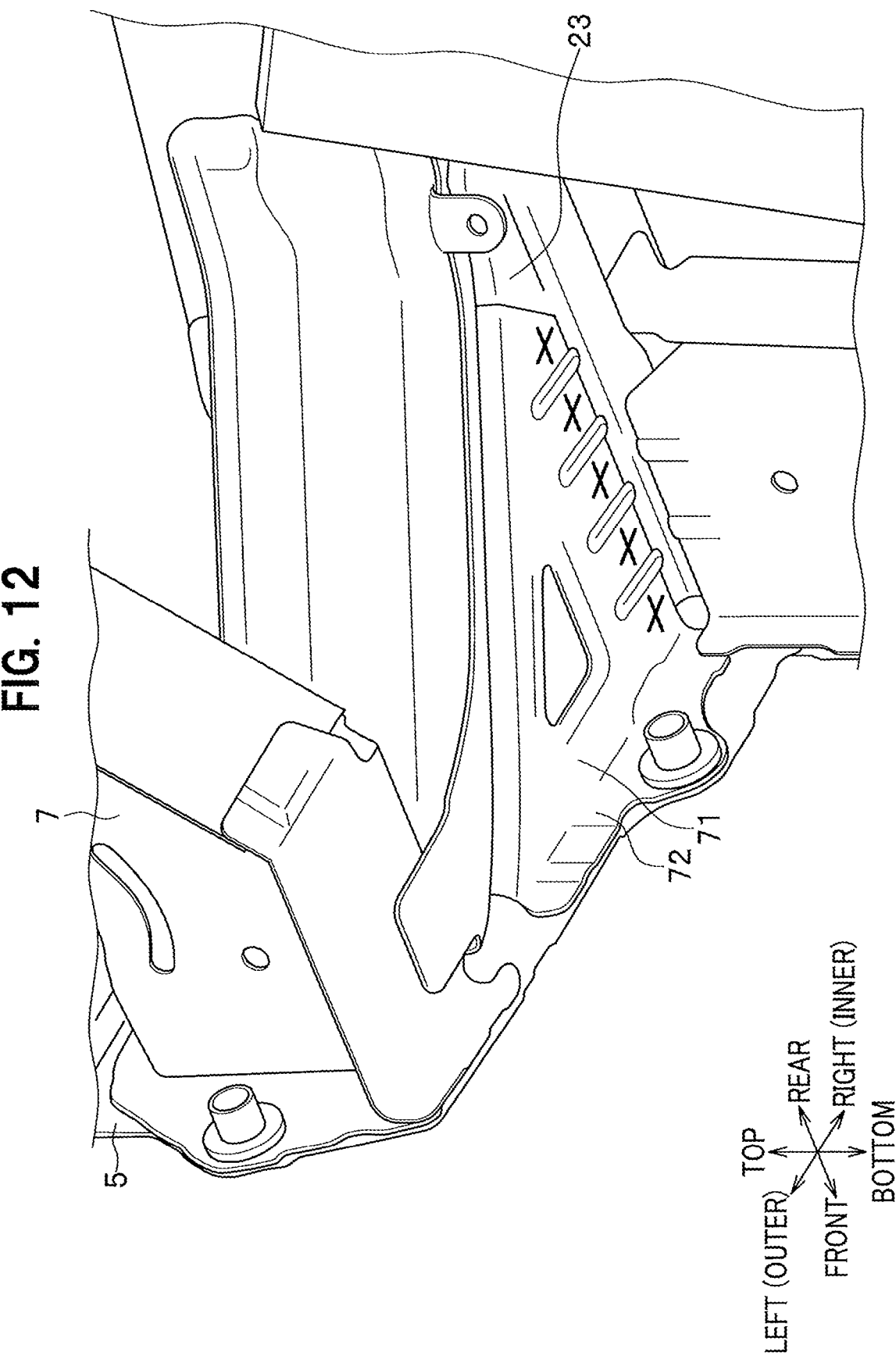
FIG. 12 is a perspective view obtained when a load receiving plate is viewed from the bottom side.

The lower wall section 71 extends in the horizontal direction and constitutes a lower wall section of the load receiving member 6. An inner end portion in the vehicle width direction of the lower wall section 71 is joined by, for instance, welding onto the lower wall section 23 of the outer panel 20 (see marks X of FIG. 12).

The flange section 72 extends downwardly of a front-end portion of the lower wall section 71 and comes into contact with the bumper beam mounting plate 5.

The flange section 73 extends upwardly of an outer end portion in the vehicle width direction of the lower wall section 71, and is secured, using a bolt(s), to the outer wall section 81 of the outer member 80.

<<Outer Member>>

The outer member 80 is integrally provided with the outer wall section 81, a flange section 82, a flange section 83, and a flange section 84.

The outer wall section 81 constitutes an outer wall section of the load receiving member 6.

The flange section 82 extends, from a front-end portion of the outer wall section 81, outwardly in the vehicle width direction and comes into contact with the bumper beam mounting plate 5.

The flange section 83 extends, from an upper end portion of the outer wall section 81, outwardly in the vehicle width direction. A portion of the flange section 83 is joined by, for instance, welding onto the lower member 7.

The flange section 84 extends, from a lower end portion of the outer wall section 81, outwardly in the vehicle width direction. A portion of the flange section 84 is joined by, for instance, welding onto the lower member 7.

<Lower Member>

The lower member 7 is a metal structural member that is positioned on the outer side in the vehicle width direction of the front side frame 2B and extends in the front-rear direction. The lower member 7 is formed by assembling rolled steel sheet pressed products, etc., having, for instance, a U-shaped cross section to give a hollow structure that presents a closed cross section in a frontal plane. A rear portion of the lower member 7 is tilted upwardly as the distance to the rear end becomes shorter. Front-end portions of the lower member 7 are connected to the bumper beam mounting plate 5 and the load receiving member 6; and a rear-end portion of the lower member 7 is connected to the upper member 8.

<Upper Member>

The upper member 8 is a metal structural member that is positioned on the rear side of the lower member 7 and extends in the front-rear direction. The upper member 8 is formed by assembling rolled steel sheet pressed products, etc., having, for instance, a U-shaped cross section to give a hollow structure that presents a closed cross section in a frontal plane.

A front-end portion of the upper member 8 is connected to a rear-end portion of the lower member 7; and a rear-end portion of the upper member 8 is connected to the front pillar 9.

<Front Pillar>

The front pillar 9 is a metal structural member that constitutes a frame part of an opening section in which a windshield is installed in a vehicle body and a frame part of an opening section in which a door is attached on a vehicle body side surface. The front pillar 9 is formed by assembling rolled steel sheets having, for instance, a U-shaped cross section to give a hollow structure that presents a closed cross section in a horizontal plane. A lower end portion of the front pillar 9 is connected to the upper member 8.

<Narrow Offset Collision>

When the vehicle body structure 1B encounters a narrow offset collision (see the input load F of FIG. 5), a site having the first bending deformation allowable section (brittle section) 21 of the front side frame 2B is subject to bending deformation such that the site is bent inwardly in the vehicle width direction in a planar view (see the polygonal line L of FIG. 5). Here, use of the brittle section 21 and the energy-absorbing member 3B can reduce (lower) the initial peak value (peak load) of a front collision load and then increase the average (average load).

In addition, the second bending deformation allowable section (first bending section) 2f of the front side frame 2B is subject to bending deformation such that the section is bent outwardly in the vehicle width direction in a planar view; and the third bending deformation allowable section (second bending section) 2g is subject to bending deformation such that the section is bent inwardly in the vehicle width direction in the planar view. As such, in the front side frame 2B, the first bending deformation allowable section (brittle section) 21, the second bending deformation allowable section (first bending section) 2f, and the third bending deformation allowable section (second bending section) 2g may be horizontally bent at the 3 points so as to absorb energy (see the polygonal line L of FIG. 5).

In addition, the load receiving member 6 advantageously transmits, to the front side frame 2B, the front collision load during a narrow offset collision. Further, the load receiving member 6 can transmit, to the lower member 7, and disperse part of the front collision load during a narrow offset collision.

Because in the vehicle body structure 1B according to the second embodiment of the present invention, the left energy-absorbing member 3B serves as a mount attachment bracket, the degree of freedom of arrangement of the energy-absorbing member 3B can be improved. In addition, because in the vehicle body structure 1B, the left energy-absorbing member 3B serves as a mount attachment bracket, the number of parts can be reduced. In addition, because in the vehicle body structure 1B, the left energy-absorbing member 3B serves as a mount attachment bracket, the average load can be increased by the amount of rigidity of the bolt B.

In addition, because in the vehicle body structure 1B, the brittle section 21 is a recessed section provided so as to avoid interference with a front wheel, another brittle section 21 does not have to be provided.

In addition, in the vehicle body structure 1B, a cross section of the front side frame 2B in a frontal plane direction becomes wider as the position becomes higher and the distance between the third wall section of the energy-absorbing member 3B and the inner wall section 11 increases as the position becomes higher. Accordingly, the average load can be further increased when compared to the case where the third wall section of the energy-absorbing member 3B is parallel to both wall sections in the vehicle width direction (the inner wall section 11 of the inner panel 10 and the outer panel 20) of the front side frame 2B.

In addition, in the vehicle body structure 1B, the distance between the first wall section and the second wall section of the energy-absorbing member 3B increases as the position becomes higher. Accordingly, the average load can be further increased when compared to the case where the first wall section and the second wall section of the energy-absorbing member 3B are parallel.

In addition, in the vehicle body structure 1B, the front side frame 2B is composed of the inner panel 10 and the outer panel 20 and the energy-absorbing member 3B is attached to the inner panel 10. Accordingly, the degree of design freedom can be increased and the productivity can also be increased.

In addition, the vehicle body structure 1B is provided with the load receiving member 6. Accordingly, the collision load during a narrow offset collision is advantageously transmitted to the front side frame 2B and a suitable bending moment occurs at the brittle section 21. Thus, the resulting bending of the front side frame 2B can cause the energy-absorbing member 3B to be crushed advantageously.

In addition, in the vehicle body structure 1B, the front side frame 2B includes, in addition to the first bending deformation allowable section 21, the second bending deformation allowable section (first bending section) 2f and the third bending deformation allowable section (second bending section) 2g. Also, the rear side of the first bending deformation allowable section (first bending section) 2f and the rear side of the second bending deformation allowable section (third bending section) 2g each have a higher rigidity. Accordingly, these sections can be bent at three points alternately in an opposite direction (when viewed in the vehicle width direction) so as to advantageously absorb impact energy.

In addition, in the vehicle body structure 1B, the load receiving member 6 and the upper wall section and/or the lower wall section (the lower wall section in this embodiment) of the front side frame 2B overlap and are joined. Accordingly, such joint can endure shear force against the load input from the outside in the vehicle width direction so as not to be easily detached.

In addition, in the vehicle body structure 1B, the load receiving member 6 is connected to the lower member 7. Accordingly, part of the load input from the outside in the vehicle width direction is dispersed through the lower member 7. This prevents the load receiving member 6 from being detached from the front side frame 2B. Also, the front side frame 2B may be bent so as to advantageously absorb impact energy.

Hereinabove, the embodiments of the present invention have been illustrated. However, the present invention is not limited to them and can be suitably modified without departing from the spirit of the present invention. For instance, the hollow frame of the present invention is applicable to a rear side frame of the vehicle body. In this case, such a structure responds to a rear collision load on the vehicle body.

REFERENCE SIGNS LIST 1A, 1B Hollow frame
2A Hollow frame
2B Front side frame (Hollow frame)
2a One wall section
2b Another wall section
2c, 2d Wall section
2e Brittle section
2f First bending section (Second bending deformation allowable section)
2g Second bending section (Third bending deformation allowable section)
3A, 3B Energy-absorbing member
4 Mount
6 Load receiving member
7 Lower member (Lower arm)
10 Inner panel
20 Outer panel
21 Brittle section (Recessed section) (First bending deformation allowable section)
PU Power unit

The invention claimed is:

1. A vehicle body structure, comprising:
a hollow frame that has a substantially rectangular closed cross section and includes a brittle section in a center part in a length direction of one wall section; and
an energy-absorbing member facing the brittle section with a gap therebetween and attached to another wall section that faces the one wall section in the closed cross section of the hollow frame,
wherein the energy-absorbing member is a member that has an approximately hat-shaped cross section when viewed in a direction perpendicular to the length direction of the hollow frame and comprises a first wall section and a second wall section erectly provided from the other wall section to the one wall section and a third wall section connecting a tip end part of the first wall section and a tip end part of the second wall section;
the third wall section faces the brittle section with a gap therebetween;
the one wall section is an outer wall section in a vehicle width direction;
the brittle section is a recessed section provided so as to avoid interference with a wheel when turned;
the cross section of the hollow frame becomes wider as a position thereof becomes higher; and
a distance between the third wall section of the energy-absorbing member and the other wall section increases as a position thereof becomes higher.

2. The vehicle body structure according to claim 1, wherein the energy-absorbing member faces each of both wall sections, which connect the one wall section and the other wall section, with a gap therebetween.

3. The vehicle body structure according to claim 1, wherein the hollow frame is a front side frame or a rear side frame; and the energy-absorbing member is a bracket to which a mount for a power unit of the vehicle is attached.

4. The vehicle body structure according to claim 1, wherein a distance between the first wall section and the second wall section of the energy-absorbing member increases as a position thereof becomes higher.

5. The vehicle body structure according to claim 1, wherein the hollow frame is formed of an inner panel including an inner wall section in a vehicle width direction, an upper wall section, and a lower wall section and an outer panel constituting an outer wall section in the vehicle width direction; and
the energy-absorbing member is attached to the inner wall section in the vehicle width direction.

6. The vehicle body structure according to claim 1, wherein the hollow frame extends in a vehicle front-rear direction; and
the vehicle body structure further comprises a load receiving member attached to a vehicle width direction outer end portion of a front-end portion of the hollow frame.

7. The vehicle body structure according to claim 6, wherein the hollow frame has the brittle section and includes:
a first bending deformation allowable section that can be subject to bending deformation such that a front collision load causes the section to be bent inwardly in the vehicle width direction in a planar view;
a second bending deformation allowable section that can be subject to bending deformation such that the front collision load causes the section to be bent, at rear of the first bending deformation allowable section, outwardly in the vehicle width direction in the planer view; and
a third bending deformation allowable section that can be subject to bending deformation such that the front collision load causes the section to be bent, at rear of the second bending deformation allowable section, inwardly in the vehicle width direction in the planar view, and wherein
a site at rear of the second bending deformation allowable section has a higher rigidity than the second bending deformation allowable section; and
a site at rear of the third bending deformation allowable section has a higher rigidity than the third bending deformation allowable section.

8. The vehicle body structure according to claim 6, wherein the load receiving member and an upper wall section and/or a lower wall section of the hollow frame overlap and are joined.

9. The vehicle body structure according to claim 6, further comprising a lower arm that is provided on an outer side in the vehicle width direction of the hollow frame and extends in the vehicle front-rear direction, wherein the load receiving member is connected to a front-end portion of the lower arm.

10. The vehicle body structure according to claim 1, wherein when a load is input from one end portion in the length direction of the hollow frame, the third wall section can come into contact with the brittle section bent by the load.

\* \* \* \* \*